Aug. 18, 1964  H. R. DUBENDORFER  3,144,783
TAPPING ATTACHMENT
Filed Jan. 18, 1963  2 Sheets-Sheet 2
FIG_4
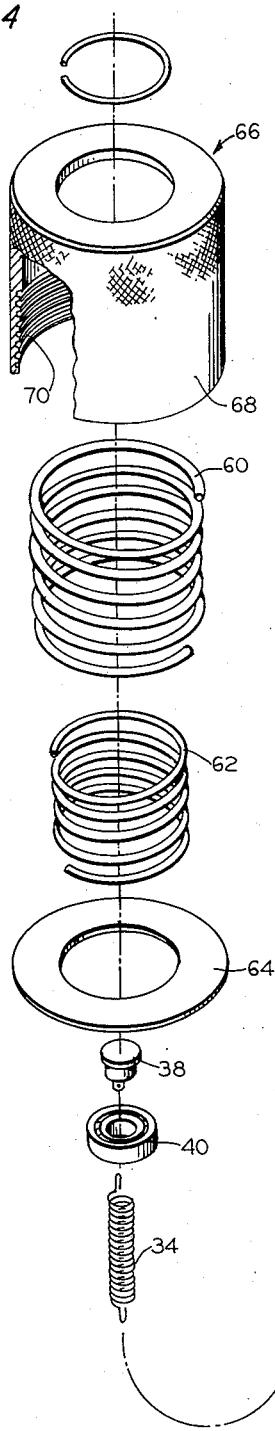
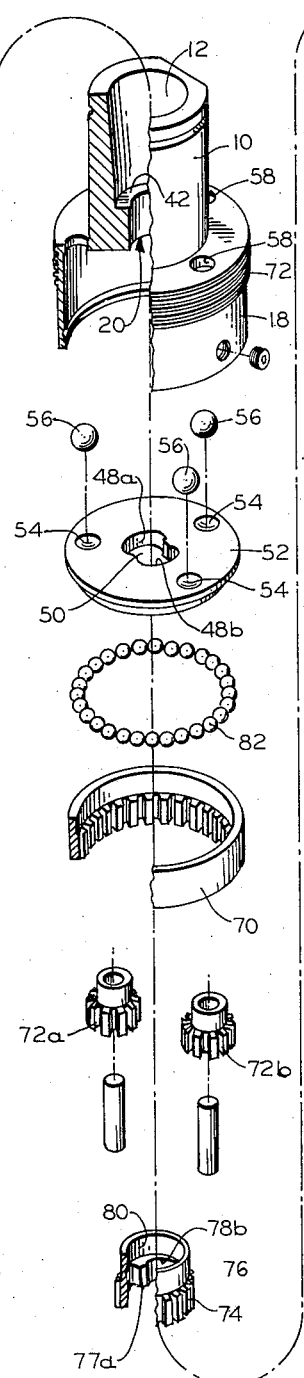
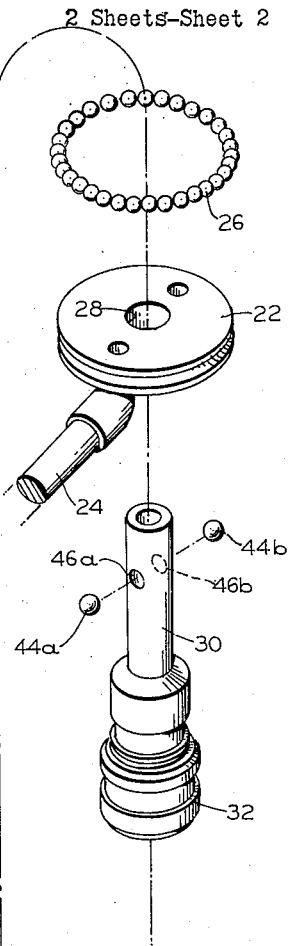
INVENTOR.
HERMAN R. DUBENDORFER
BY

United States Patent Office 3,144,783
Patented Aug. 18, 1964

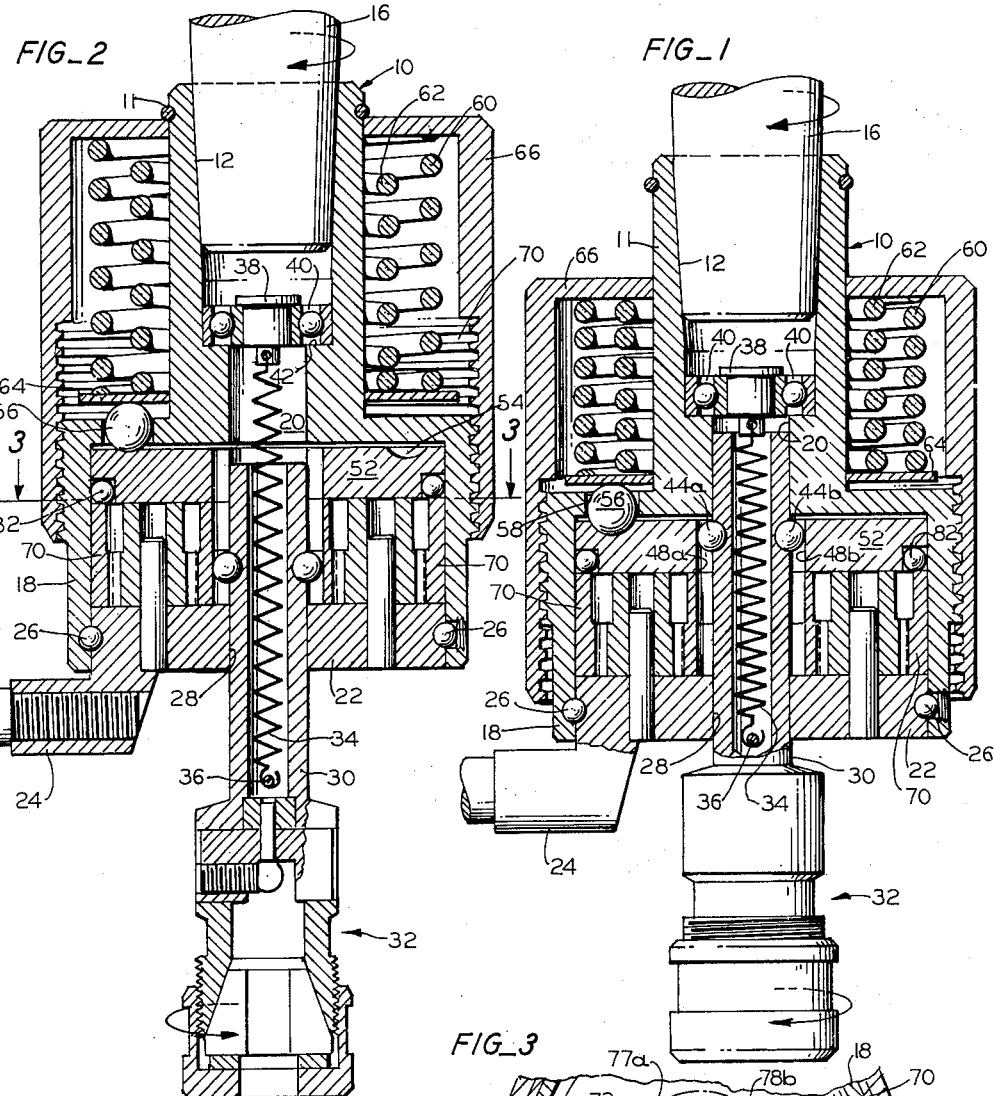

3,144,783
TAPPING ATTACHMENT
Herman R. Dubendorfer, 1513 Princeton Drive,
San Jose 24, Calif.
Filed Jan. 18, 1963, Ser. No. 252,357
12 Claims. (Cl. 74—376)

The present invention relates to reversible power transmissions in the form of attachments that may be secured to a drive shaft to deliver its rotary power in one or the other direction to a rotary tool. More particularly the present invention relates to attachments, of the type referred to, that will drive a tap secured thereto at a predetermined speed in one direction when the tap is held against the work to cut an internal thread, and which will automatically reverse themselves and drive the tap with increased speed in the opposite direction when the tap is pulled away from the work.

It is an object of my invention to provide a power transmission attachment, of the type referred to, that suspends operation of a driven tool whenever the tool encounters improper resistance.

Another object of the invention is to provide a tapping attachment whose resistance sensitivity is adjustable so that the attachment may readily be adapted for operation with taps of different sizes and on work pieces of different hardness.

Furthermore, it is an object of my invention to provide a power transmission attachment of the type referred to, that combines compactness and simplicity of construction with ease of manipulation and smoothness of operation.

More specifically it is an object of the invention to provide an attachment, of the type referred to, that encompasses a minimum of components of simple construction and is easy to assemble.

These and other objects of the present invention will be apparent from the following description of the accompanying drawings which illustrate a preferred embodiment thereof and wherein FIGURE 1 is an axial section through a tapping attachment embodying my invention showing it in its tap-driving position;

FIGURE 2 is a section, similar to FIGURE 1, illustrating the attachment in its tap-reversing position.

FIGURE 3 is a fragmentary cross section taken along line 3—3 of FIGURE 2, and viewed in the direction of the arrows associated with said line; and FIGURE 4 is an exploded perspective illustrating the various components of the attachment.

The tapping attachment of my invention comprises an input shaft 10 whose outer end 11 is tubular and has a tapering inner surface 12 to establish a tight fit with the correspondingly tapered end of a drive shaft 16. The opposite end of the shaft 10 is radially expanded to form an inverted cup 18 that has a center bore 20 which communicates with, but is of smaller diameter than, the hollow interior of the tubular shaft portion 11. The edge of cup 18 fits slidably over a circular base plate 22 that may be held in stationary condition during performance of the device by means of a radially extending arm 24. A ring of balls 26 is interposed between the edge of cup 18 and the edge of base plate 22 so that the cup may rotate freely about said plate. Received in a central aperture 28 of the plate 22 for both, rotary and axially sliding, motion relative to said plate is the output shaft 30 of the attachment, which is likewise of tubular construction and which carries upon its outer end a socket 32 of conventional design for mounting a rotary tool, such as a tap (not shown).

When the attachment of the invention is in the position illustrated in FIGURE 1, wherein it drives the tool in the same direction as the direction of rotation of the rotary power applied to its input shaft 10, the inner end of the output shaft 30 is received within the above mentioned bore 20 in the center of cup 18. To hold the shaft 30 yieldably in the defined position in a manner permitting rotation thereof in a direction opposite to the rotation of the input shaft, a spring 34 is tensioned between a stud 36 within the hollow interior of the shaft 30 and a cylindrical plug 38 that is rotatably held within a ball bearing 40 which is located upon the annular shoulder 42 formed between the tubular outer portion 11 of the input shaft 10 and the bore 20 in the bottom of the cup portion 18 of said shaft. In the defined position of the output shaft 30, a pair of balls 44a and 44b received in diametrically opposite cavities 46a and 46b of said shaft engage axially extending recesses 48a and 48b, respectively, in the center bore 50 of a disk 52 (FIGURE 4) that is arranged about the output shaft 30 and is located adjacent the bottom of inverted cup 20 (FIGURE 1). Thus, in the position of shaft 30 illustrated in FIGURE 1 a driving connection is established between said disk 52 and said shaft. While said disk 52 is of a size to rotate freely within the cup 20 of input shaft 10, it is normally coupled to said cup for rotation therewith by a clutch mechanism that is arranged to suspend driving connection between the cup and the disk when rotation of the output shaft 30 encounters a resistance of predetermined strength. For this purpose the upper surface of the disk 52 is provided with a plurality of angularly equispaced shallow hemispherical cavities 54 that are normally engaged by balls 56 which are located in apertures 58 provided in the bottom of the inverted cup 20, and which project a limited distance above the top surface of said cup. Said balls are urged into engagement with the cavities 54 in disk 52 with an adjustable force by a pair of expansion springs 60 and 62 that are arranged concentrically about the input shaft 10 and which are confined between an annular disk 64 that overlies the projecting segments of balls 56 and the ceiling of a centrally apertured cap 66. Said cap surrounds the input shaft 10 and has a side wall 68 that is provided with internal screw threads 70 which engage external threads 72 arranged along the outer surface of the inverted cup 20 (FIGURE 4). As best apparent from FIGURE 2, said springs 60 and 62 are of different axial length and may be of different thickness and resiliency. Initially, therefore, it is only the longer spring 60 which is compressed between the ceiling of cap 66 and the annular disk 64 so that only said spring 60 exerts pressure upon the balls 56 to keep said balls in engagement with the cavities 54 in disk 52 and thus establish a driving connection between the cup portion 20 of the input shaft 10 and the output shaft 30. In the position of cap 66 illustrated in FIGURE 2, relatively slight resistance to the operation of the tool held in socket 32 will be sufficient to cam the balls 56 from engagement with the cavities 54 in disk 52 and thus break the power train between the input shaft 10 and the output shaft 30 of the attachment causing the balls 56 to slide ineffectively around the disk 52 and over the cavities provided therein. The position of adjustment illustrated in FIGURE 2 is, therefore, suited for situations when small apertures are to be tapped to form delicate screw threads that might easily be destroyed by positive rotation of the tap without corresponding advance of the tool and where it is necessary that the tool cease to turn as soon as its axial advance is impeded.

When heavier threads are to be cut where the proper operation of the tap must overcome substantial resistance to the cutting operation, it is merely necessary to tighten the cap 66 upon cup 20. This compresses the spring 60 and thus exerts a greater but still yieldable force upon the balls 56 in the apertures 58 of the rotating cup portion 20 of input shaft 10 to engage the cavities 54 in the power transmitting disk 52. Eventually, when the cap 66 is turned down further upon the cup 20, the ceiling of said cap engages not only the outer spring 60 but also the inner spring 62 causing both said springs to urge the balls 56 into engagement with the cavities 54 in disk 52. The presence of the second, initially ineffective spring 62, therefore, provides, for the instrument of my invention, a second range of adjustment which may be of a different order of magnitude and which may be made to supply a more rapid increase in the engagement-establishing force exerted upon the balls 56 with each increment of adjustment of cap 66. Thus, the described arrangement in the attachment of my invention extends the range of adaptability of the device to different situations of operation to a substantial degree, without any increase in the size of the instrument and without complicating its construction or increasing its cost to any significant degree. The instrument may now be used to cut heavy as well as very delicate threads.

When a thread has been cut, it is necessary that the operation of the tap be reversed so that the tap may smoothly be withdrawn from the newly threaded hole. Reverting to FIGURE 1, the lower cup-shaped portion 20 of the input shaft 10 is continually in clockwise rotation as viewed from the top, as long as rotary power in a clockwise rotation is applied to it by drive shaft 16. Said cup carries along its inner wall a ring gear 70 (FIGURE 3) which meshes with a pair of planetary gears 72a and 72b that are rotatably supported upon the stationary base plate 22 at opposite sides of the output shaft 30. Said planetary gears mesh with a sun gear 74 that is loosely arranged around the output shaft 30 and turns normally about said shaft without effect upon the rotary position thereof. The inner surface of the tubular hub 76 of said sun gear forms two diametrically opposite projections 77a and 77b (FIGURE 3) which define two arcuate recesses 78a and 78b that are adapted to receive the previously described balls 44a and 44b in the upper end of the output shaft 30. Upon completion of a tapping operation, when the tool is withdrawn from the work piece, or vice versa, when the work piece is withdrawn from the tool, the resultant pull exerted upon the output shaft by engagement of the tap with the newly cut threads, is effective to slide the output shaft against the urgency of spring 34 from the position illustrated in FIGURE 1 to the position illustrated in FIGURE 2. The first effect of the described movement of the output shaft is disengagement of the balls 44a, 44b from the recesses 48a, 48b in power transmission disk 52 so that said disk is now unable to transmit its rotary power to the output shaft, and idles ineffectively about said shaft. Further outward movement of the shaft passes the balls 44a and 44b through a neutral zone established by the space 80 (FIGURE 4) of the tubular hub 76 of the sun gear 74 above the projections 77a and 77b, which space is of a sufficiently large internal diameter for the hub 76 to rotate idly about said balls. In this position the output shaft 30 remains stationary. Continued outward movement of the output shaft 30 relative to the remaining structure of the attachment, however, bring the balls 44a and 44b on said shaft into engagement with the arcuate recesses 78a and 78b and against the projections 77a and 77b in the hub 76 of the sun gear and in this manner couples the output shaft to said sun gear. Since the cup 20 of input shaft 10 and hence its internal ring gear 70 turn in a clockwise direction, the planetary gears 72a and 72b enmeshed with said ring gear must likewise turn in clockwise direction, and in turn drive the sun gear in counterclockwise direction at an increased speed as compared with the speed of the input shaft 10. Hence, the output shaft 30 of the attachment which is now coupled to said sun gear, must likewise turn in a counterclockwise direction and thus unwinds the tap in its socket 32 with increased speed from engagement with the newly cut threads. Reversal in the operation of the output shaft is therefore accomplished in the simplest manner by movement of the balls 44a and 44b on said output shaft from engagement with the recesses 48a and 48b in the power transmission disk 52 into engagement with the recesses 68a and 68b in the sun gear 74; and due to the fact that the spring 34 which yieldably opposes the described movement of the output shaft, is anchored in a plug 38 that is held in the tubular portion 11 of the input shaft 10 by a ball bearing as explained hereinbefore, the output shaft may be rotated at great speed within the oppositely turning input shaft without significant wear of, or strain upon, said spring.

Upon withdrawal of the tap from the newly threaded hole, the spring 34 returns the output shaft automatically to a position wherein the balls 44a and 44b engage the recesses 48a and 48b in the power transmission disk 52 so that said output shaft is again coupled directly to the input shaft and the instrument is ready for another tapping operation.

In practical use, a tap is secured in the socket 32 on output shaft 30 and the position of the cap 66 is adjusted by rotation thereof to adapt the attachment to the particular task which it has to perform. If the threads to be cut are small and delicate, the instrument may be left in the position illustrated in FIGURE 2 where only the outer and axially longer spring 60 holds the balls 56 within the apertures 58 of the cup-shaped portion 20 of the output shaft in engagement with the cavities 54 in the power transmission disk 52. If heavy threads are to be cut, the cap may be screwed down upon cup 20 until both the springs 60 and 62 bear heavily upon the balls 56. Power is now applied to the input shaft 10 of the device and is transmitted through the balls 56 and the disk 52 to the output shaft 30 to drive the tap in clockwise direction; and as soon as the tool encounters abnormal resistance the attachment of my invention, rather than forcing the tap to continue its work with the danger of damaging the work piece, suspends transmission of power to its output shaft in that the balls 56 are cammed out of driving engagement with the cavities 54 in disk 52 at a moment that depends upon the setting of cap 66.

When the cutting of the thread has been completed and the tool and work piece are pulled asunder, the resultant outward movement of the output shaft 30 disengages said shaft from the power transmission disk 52 and eventually establishes a driving connection between the sun gear 74 and said output shaft; and as the input shaft 10 of the attachment continues to rotate in clockwise direction, the internal ring gear 70 provided along the inner surface of its cup-shaped extension 20 turns the planetary gears 72a and 72b upon the stationary base plate 42 in the same direction. This causes said gears to march around the sun gear in a clockwise direction and to turn said sun gear in a counterclockwise direction at a substantially higher speed than the speed of the input shaft 10. Thus, the operation of the output shaft 30 is reversed and it now turns the tapping tool in its socket 32 in a counterclockwise direction at an increased speed so that the tap may quickly disengage itself from the hole in the work piece.

The attachment of my invention is easy to handle and is easy to adjust to different operating conditions. It is of a simple and inexpensive construction. As compared with known tapping attachments, it consists of a relatively small number of simple components that may easily be assembled and once assembled remain dependably in their proper positions relative to one another without special centering, spacing or retaining elements. Thus, the components of the planetary gear train are dependably held in engagement with one another, by the presence above them, of the power transmission disk 52, and as the operation of the output shaft 30 is reversed, the path of the coupling balls 44a and 44b is such that they cannot possibly be dislocated or lost.

While I have described my invention with the aid of a particular embodiment thereof, it will be understood that the invention is not limited to the specific constructional details shown and described which may be departed from without departing from the scope and spirit of the invention.

I claim:

1. A power transmission attachment comprising a rotatable input shaft having an end portion expanded into an inverted cup possessing a bottom containing apertures and a side wall having external threads, a rotatable output shaft, a base for rotatably supporting said output shaft, a disk within said cup adjacent the bottom thereof having a plurality of cavities in its surface adjacent the bottom of said cup, means for coupling said output shaft for common rotary movement to said disk, coupling members of a size to fit into said cavities located in the apertures in the bottom of said cup, a cap arranged concentrically around said input shaft and having a side wall containing internal threads in engagement with said external threads in the side wall of said inverted cup for adjustment of the position of said cap relative to said cup, and an expansion spring arranged coaxially around said input shaft in the space between said cap and said cup to urge said coupling members yieldably into engagement with the cavities in said disk.

2. A power transmission attachment comprising a rotatable input shaft having an end portion expanded into an inverted cup possessing a bottom containing apertures and a side wall having external threads, a rotatable output shaft, means upon the outer end of said output shaft for supporting a rotary tool, a base for rotatably supporting said output shaft, a disk within said cup adjacent the bottom thereof having a plurality of cavities in its surface adjacent the bottom of said cup, means for coupling said output shaft for common rotary movement to said disk, balls of a size to fit into said cavities located in the apertures in the bottom of said cup with segments thereof projecting beyond said bottom on the side remote from said disk, a cap arranged concentrically around said input shaft and having a side wall containing internal threads in engagement with said external threads in the side wall of said inverted cup for adjustment of the position of said cap relative to said cup, and a plurality of expansion springs of different axial length arranged coaxially around said input shaft in the space between said cap and said cup to bear against and urge said balls yieldably into engagement with the cavities in said disk with a force depending upon the position of said cap relative to said cup.

3. A power transmission attachment comprising a rotatable input shaft having an end portion expanded into an inverted cup possessing a bottom containing apertures and a side wall having external threads, a rotatable output shaft, means upon the outer end of said output shaft for supporting a rotary tool, a base for rotatably supporting said output shaft, a disk within said cup adjacent the bottom thereof having a plurality of cavities in its surface adjacent the bottom of said cup, means for coupling said output shaft for common rotary movement to said disk, balls of a size to fit into said cavities located in the apertures in the bottom of said cup with segments thereof projecting beyond said bottom on the side remote from said disk, an annular washer arranged to overlie the projecting segments of said balls, a cap arranged concentrically around said input shaft and having a side wall containing internal threads in engagement with said external threads in the side wall of said inverted cup for adjustment of the position of said cap relative to said cup, and a pair of expansion springs of different axial length arranged coaxially around said input shaft in the space between said cap and said cup to bear against said annular washer so as to urge said balls yieldably into engagement with the cavities in said disk with a force depending upon the position of said cap relative to said cup.

4. A tapping attachment comprising a rotatable input shaft having an end portion radially expanded to form an inverted cup possessing a bottom containing apertures and a side wall having external threads, a rotatable output shaft, means upon the outer end of said output shaft for supporting a rotary tool, a base for supporting said output shaft for axial movement coaxially with said input shaft between a first position close to said input shaft and a second position removed from said input shaft, a disk within said cup adjacent the bottom thereof having a plurality of cavities in its surface adjacent the bottom of said cup, means upon said output shaft effective to couple said shaft for common rotary movement to said disk when said output shaft is in said first position, means yieldably urging said output shaft into said first position, coupling members of a size to fit into said cavities located in the apertures in the bottom of said cup, a cap arranged concentrically around said input shaft and having a side wall containing internal threads in engagement with said external threads in the side wall of said inverted cup for adjustment of the position of said cap relative to said cup, an expansion spring arranged around said input shaft in the space between said cap and said cup to urge said coupling members yieldably into engagement with the cavities in said disk with a force depending upon the position of said cap relative to said cup, an internal ring gear along the edge of said cup, a sun gear arranged loosely around said output shaft, planetary gears in mesh with said inner ring gear and said sun gear rotatably supported from said base to drive said sun gear in a direction opposite to said ring gear, means upon said sun gear effective in combination with the coupling means on said output shaft upon movement thereof into said second position to couple said output shaft to said sun gear for rotation therewith in a direction opposite to the direction of rotation of said input shaft.

5. A tapping attachment comprising a rotatable input shaft having an end portion radially expanded to form an inverted cup possessing a bottom containing apertures and a side wall having external threads, a rotatable output shaft, means upon the outer end of said output shaft for supporting a tap, a base for supporting said output shaft for axial movement coaxially with said input shaft between a first position close to said input shaft and a second position removed from said input shaft, a disk within said cup adjacent the bottom thereof having a plurality of cavities in its surface adjacent the bottom of said cup, means upon said output shaft effective to couple said shaft for common rotary movement to said disk when said output shaft is in said first position, means yieldably urging said output shaft into said first position, balls of a size to fit into said cavities located in the apertures in the bottom of said cup, a cap arranged concentrically around said input shaft and having a side wall containing internal threads in engagement with said external threads in the side wall of said inverted cup for adjustment of the position of said cap relative to said cup, a plurality of expansion springs of different axial length arranged around said input shaft in the space between said cap and said cup to urge said balls yieldably into engagement with the cavities in said disk with a force depending upon the position of said cap relative to said cup, an internal ring gear along the edge of said cup exteriorly of said disk, a sun gear arranged loosely around said output shaft exteriorly of said disk, planetary gears in mesh with said inner ring gear and said sun gear rotatably supported between said base and said disk to drive said sun gear in a direction opposite to said ring gear, means upon said sun gear effective in combination with the coupling means on said output shaft upon movement thereof into said second position to couple said output shaft to said sun gear for rotation therewith in a direction opposite to the direction of rotation of said input shaft.

6. A tapping attachment comprising a rotatable input shaft having an end portion expanded into an inverted cup possessing a bottom containing apertures and a side wall having external threads, a rotatable output shaft, means upon the outer end of said output shaft for supporting a tap, a base for supporting said output shaft for axially sliding movement coaxially with said input shaft between a first position close to said input shaft and a second position removed from said input shaft, a coupling disk within said cup adjacent the bottom thereof having a plurality of cavities in its surface adjacent the bottom of said cup, means upon said output shaft effective to couple said output shaft for common rotary movement to said disk when said output shaft is in said first position, means yieldably urging said output shaft into said first position, balls of a size to fit into said cavities located in the apertures in the bottom of said cup with segments thereof projecting beyond said bottom at either side thereof, an annular washer arranged to overlie the projecting segments of said balls on the side remote from said disk, a cap arranged concentrically around said input shaft and having a side wall containing internal threads in engagement with said external threads in the side wall of said inverted cup for adjustment of the position of said cap relative to said cup, a number of expansion springs of different axial length arranged coaxially around said input shaft in the space between said cap and said cup to bear against said annular washer so as to urge said balls yieldably into engagement with the cavities in said disk with a force depending upon the position of said cap relative to said cup, an internal ring gear along the edge of said cup, a sun gear arranged loosely around said output shaft, planetary gears in mesh with said inner ring gear and said sun gear rotatably supported from said base to drive said sun gear in a direction opposite to said ring gear, means upon said sun gear effective in combination with the coupling means on said output shaft upon movement thereof into said second position to couple said output shaft to said sun gear for rotation therewith in a direction opposite to the direction of rotation of said input shaft.

7. A transmission arrangement comprising a first tubular shaft, a second shaft disposed coaxially with said first shaft, means for supporting said shafts for movement relative to each other along their common axis between a first and second position, means effective when said shafts are in said first position for coupling said shafts for movement in the same direction, means effective when said shafts are in said second position for coupling said shafts for movement in opposite directions, and means for yieldably holding said shafts in one of said positions including a ball bearing located in the interior of said first shaft, an element rotatably held in said ball bearing and a spring tensioned between said element and said second shaft.

8. A transmission arrangement comprising a first tubular shaft, a second tubular shaft disposed coaxially with said first shaft with one of its ends extending into said first shaft, means for supporting said shafts for movement relative to each other along their common axis between a first and second position, means effective when said shafts are in said first position for coupling said shafts for movement in the same direction, means effective when said shafts are in said second position for coupling said shafts for movement in opposite directions, and means for yieldably holding said shafts in one of said positions including a ball bearing located in the interior of said first shaft, a cylindrical element rotatably held in said ball bearing and a spring tensioned between said element and a point in the interior of said second shaft.

9. A transmission arrangement comprising a first tubular shaft having an internal shoulder, a second tubular shaft of a size to fit into said first shaft disposed coaxially with said first shaft with one of its ends extending into said first shaft, means for supporting said shafts for movement relative to each other along their common axis between a first and second position, means effective when said shafts are in said first position for coupling said shafts for movement in the same direction, means effective when said shafts are in said second position for coupling said shafts for movement in opposite directions, and means for yieldably holding said shafts in one of said positions including a ball bearing located upon the internal shoulder in said first shaft, a cylindrical plug rotatably held in said ball bearing, and a spring tensioned between said plug and a point in the interior of said second shaft.

10. A tapping attachment comprising an input shaft having an end expanded radially into the form of a cup, an output shaft disposed coaxially with said input shaft and having a cavity in its outer surface, a coupling element in said cavity, a centrally apertured disk arranged around said output shaft, said disk having an axially extending recess provided in the wall of its aperture, means coupling said disk to said cup, an internal ring gear provided on said cup exteriorly of said disk, sun gear having a tubular hub arranged around said output shaft exteriorly of said disk, said hub having an axially extending recess provided in its inner wall, a planetary gear enmeshed with said ring gear and said sun gear, and means for supporting said output shaft for axially sliding movement between a first position wherein said coupling element engages the recess in said disk for rotation of said output shaft with said disk in the same direction as the direction of rotation of said input shaft, and a second position wherein said coupling element engages the recess in said sun gear for rotation of said output shaft with said sun gear in a direction opposite to the direction of rotation of said input shaft.

11. A tapping attachment comprising an input shaft having an end expanded radially in the manner of a cup, an output shaft disposed coaxially with said input shaft and having a cavity in its outer surface, a ball in said cavity, a centrally apertured disk arranged around said output shaft, said disk having an axially extending recess provided in the wall of its aperture, means releaseably coupling said disk to said cup, an internal ring gear provided on said cup exteriorly of said disk, sun gear having a tubular hub arranged around said output shaft exteriorly of said disk, said hub having an axially extending recess provided in its inner wall, a planetary gear enmeshed with said ring gear and said sun gear, means for supporting said output shaft for axially sliding movement between a first position wherein said ball engages the recess in said disk for rotation of said output shaft with said disk in the same direction as the direction of rotation of said input shaft and a second position wherein said ball engages the recess in said sun gear for rotation of said output shaft with said sun gear in a direction opposite to the direction of rotation of said input shaft; and means for yieldably holding said output shaft in said first position.

12. Attachment according to claim 11 wherein both said shafts are tubular, and said means for yieldably holding said output shaft in said first position comprises a ball-bearing located within said input shaft, a cylindrical plug held in said ball-bearing and a spring tensioned between said plug and a point in the interior of said output shaft.

References Cited in the file of this patent
UNITED STATES PATENTS

| | | |
|---|---|---|
| 2,795,146 | Alfredeen | June 11, 1957 |
| 3,037,393 | Bernhard | June 5, 1962 |
| 3,041,893 | Johnson | July 3, 1962 |